(12) United States Patent
Suwa et al.

(10) Patent No.: US 10,848,644 B2
(45) Date of Patent: Nov. 24, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Tetsuya Suwa, Yokohama (JP); Hidetsugu Kagawa, Kawasaki (JP); Shuhei Ogawa, Kawasaki (JP); Maya Yazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/449,740

(22) Filed: Jun. 24, 2019

(65) Prior Publication Data

US 2020/0007717 A1    Jan. 2, 2020

(30) Foreign Application Priority Data

Jun. 29, 2018 (JP) ................................ 2018-125284

(51) Int. Cl.
*H04N 1/60* (2006.01)
(52) U.S. Cl.
CPC ......... *H04N 1/6005* (2013.01); *H04N 1/6027* (2013.01); *H04N 1/6086* (2013.01); *H04N 1/6097* (2013.01); *H04N 1/6008* (2013.01)
(58) Field of Classification Search
CPC .. H04N 1/6005; H04N 1/6027; H04N 1/6086; H04N 1/6097; H04N 1/6008
USPC ............................... 358/3.26, 1.9, 1.15, 3.27
See application file for complete search history.

(56) References Cited

U.S. PATENT DOCUMENTS

| | | | |
|---|---|---|---|
| 6,608,926 B1 | 8/2003 | Suwa et al. |
| 6,694,051 B1 | 2/2004 | Yamazoe et al. |
| 7,432,985 B2 | 10/2008 | Ishikawa et al. |
| 7,924,469 B2 | 4/2011 | Ono et al. |
| 7,944,588 B2 | 5/2011 | Yamada et al. |
| 8,008,562 B2 | 8/2011 | Ikeda et al. |
| 8,175,155 B2 | 5/2012 | Suwa et al. |
| 8,237,991 B2 | 8/2012 | Ono et al. |
| 9,088,753 B2 | 7/2015 | Akiba et al. |
| 9,135,523 B2 | 9/2015 | Kato et al. |

(Continued)

FOREIGN PATENT DOCUMENTS

| | | |
|---|---|---|
| JP | 2011-086976 A | 4/2011 |
| JP | 2015-156615 A | 8/2015 |

OTHER PUBLICATIONS

U.S. Appl. No. 16/418,351, filed May 21, 2019, Named Inventors: Tetsuya Suwa, et al.

(Continued)

*Primary Examiner* — Quang N Vo
(74) *Attorney, Agent, or Firm* — Venable LLP

(57) ABSTRACT

An image processing apparatus comprises: an obtaining unit configured to obtain a dynamic range of a captured image on captured image data; a determination unit configured to determine a dynamic range of a printed product when viewed obtained by printing the captured image based on the captured image data, based on printing information on viewing of the printed product; and a conversion unit configured to perform conversion processing for luminance of the captured image data to the dynamic range determined by the determination unit from the dynamic range obtained by the obtaining unit.

12 Claims, 9 Drawing Sheets

(56) References Cited

U.S. PATENT DOCUMENTS

| | | | |
|---|---|---|---|
| 9,189,681 B2 | 11/2015 | Kunieda et al. | |
| 9,232,109 B2 | 1/2016 | Suwa et al. | |
| 9,275,270 B2 | 3/2016 | Suwa et al. | |
| 9,386,186 B2 | 7/2016 | Mochizuki et al. | |
| 9,652,687 B2 | 5/2017 | Sato | |
| 9,769,352 B2 | 9/2017 | Yanai et al. | |
| 2003/0011790 A1* | 1/2003 | Schulte | H04N 1/407 358/1.1 |
| 2003/0095197 A1* | 5/2003 | Wheeler | H04N 1/40 348/241 |
| 2012/0268759 A1 | 10/2012 | Ono et al. | |
| 2013/0121572 A1* | 5/2013 | Paris | H04N 19/30 382/166 |
| 2013/0271775 A1 | 10/2013 | Chang | |
| 2015/0245000 A1 | 8/2015 | Sato | |
| 2017/0309011 A1 | 10/2017 | Hori et al. | |
| 2017/0316558 A1 | 11/2017 | Hori et al. | |

OTHER PUBLICATIONS

U.S. Appl. No. 16/446,838, filed Jun. 20, 2019, Named Inventors: Hidetsugu Kagawa, et al.
U.S. Appl. No. 16/448,210, filed Jun. 21, 2019, Named Inventors: Shuhei Ogawa, et al.
U.S. Appl. No. 16/458,965 filed Jul. 1, 2019, Named Inventors: Maya Yazawa, et al.
U.S. Appl. No. 16/459,090, filed Jul. 1, 2019, Named Inventors: Hidetsugu Kagawa, et al.
Kazuyasu Ohwaki, et al., "Technology to Optimize Image Brightness and Contrast," [online], 2009, Toshiba Review, vol. 64, No. 6 (2009), pp. 19-22 (Internet <URL:https://www.toshiba.co.jp/tech/review/2009/06/64_06pdf/a06.pdf>).

\* cited by examiner

FIG. 5A

| R(%) | | NORMAL MODE | HIGH-LUMINANCE OBTAINING MODE |
|---|---|---|---|
| CAMERA TYPES | A | 220 | 440 |
| | B | 250 | 500 |
| | C | 260 | 520 |

FIG. 5B

| LUMINANCE VALUE (cd/m$^2$) | | BLACK | WHITE |
|---|---|---|---|
| SHEET TYPES | I | 5 | 90 |
| | II | 10 | 88 |
| | III | 15 | 82 |

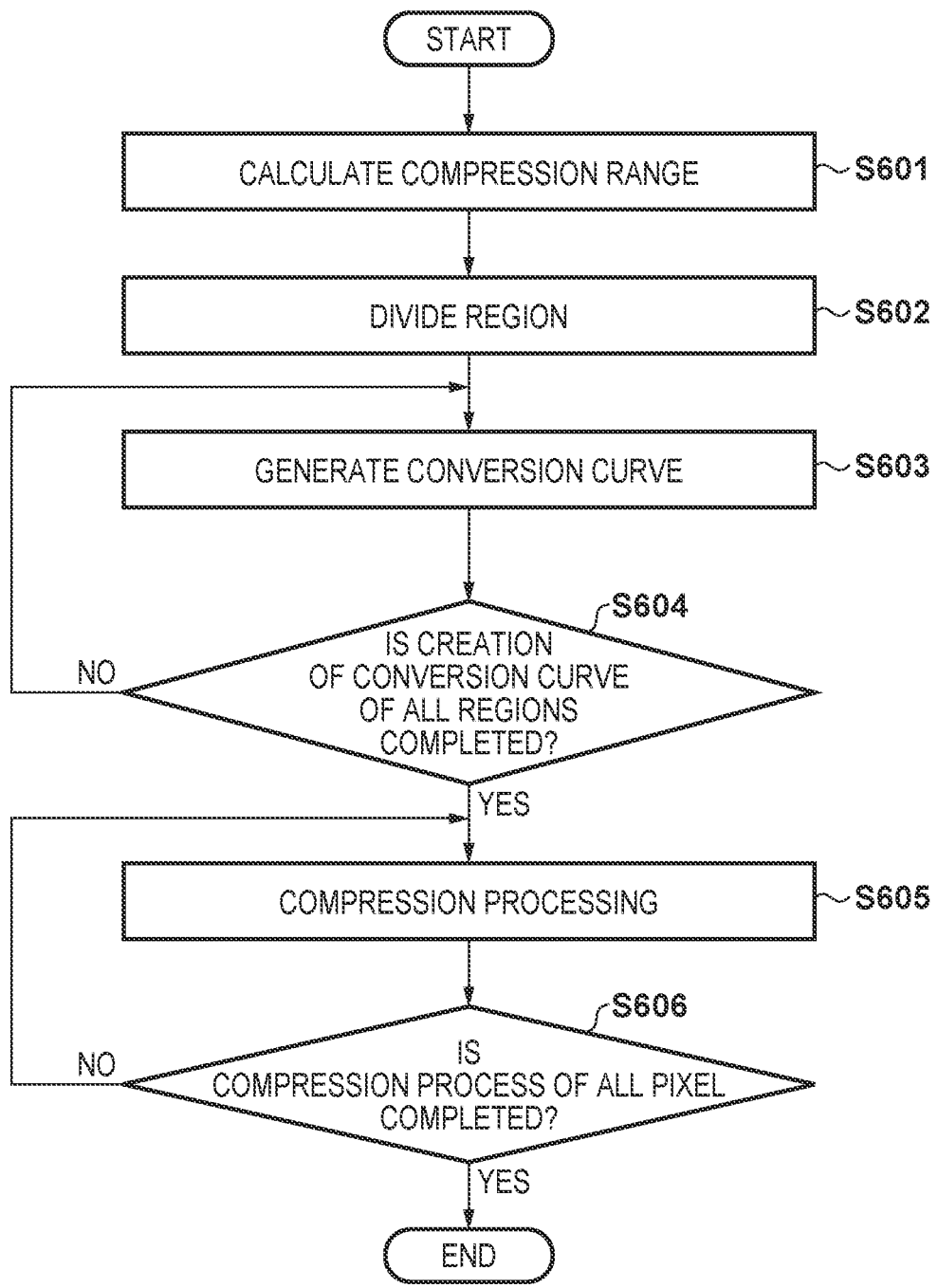

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

A recent digital camera can perform image capturing in a wide luminance range (to be referred to as a dynamic range) in order to output a captured image to a high-luminance display device. In a digital camera, since a sensor for converting light into a signal can be arranged to receive many kinds of light components, a region (a highlight-detail loss portion), a signal value of which is saturated so far to whiten a high-luminance portion, can be reproduced.

A method of extending the reproducibility on the high-luminance side by image processing is proposed. Japanese Patent Laid-Open No. 2015-156615 implements, based on an image analysis result, gradation reproduction for the high-luminance portion saturated in a specific color. From the viewpoint of both the device performance improvement and the image processing, there is proposed a method of extending the dynamic range of captured image data.

Under these circumstances, in order to implement an optimal printing quality, appropriate processing must be performed in consideration of the dynamic range of an input image and the dynamic range on the output side. In general, the dynamic range on the input side is wider than the dynamic range on the output side in some cases. If wrong processing is performed for the input image, image quality troubles may cause such that the resultant image quality may have extremely different brightness or a low contrast.

Japanese Patent Laid-Open No. 2011-86976 discloses processing based on a Retinex theory of separating an image into an illumination light component and a reflectance component and performing image contrast correction as processing for correcting the image contrast. Kazuyasu Ohwaki, et al, "Technology to Optimize Image Brightness and Contrast", [online], 2009, Toshiba Review Vol. 64, No. 6 (2009), pp. 19-22 [searched May 8, 2018], Internet <URL:https://www.toshiba.co.jp/tech/review/2009/06/64_06pdf/a06.pdf> discloses a technique for creating a mapping curve suitable for each region in the Retinex theory.

Use of various kinds of print sheets to be used has progressed in photo printing. Sheets having various kinds (types and sizes) of characteristics can be selected in consideration of appearance modes of a captured object and a printed photo image in addition to simple printing of a photo image. The dynamic range capable of reproducing an image can change due to the type of sheet and the environment for viewing the printed product. For example, a glossy sheet has a higher black density than that of a mat sheet with a low surface gloss characteristic and generally has a wider reproducible dynamic range. In a case of an exhibition, one-man exhibition, or a gallery to be viewed with an illumination, the dynamic range of the printed product can be widened due to the illumination effect.

Even if the processing of the related art is applied and printing is performed, an appropriate output dynamic range cannot be obtained without consideration of the characteristic of the print sheet. As a result, a good printed product cannot be obtained. In addition, an appropriate printed product cannot be obtained without consideration of the viewing environment of the printed product as a factor which influences the dynamic range in addition to the type of sheet. That is, if the printing information of a printed product using a captured image is not considered, the printed product of an image having appropriate brightness cannot be produced.

SUMMARY OF THE INVENTION

According to one aspect of the present invention, there is provided an image processing apparatus comprising: an obtaining unit configured to obtain a dynamic range of a captured image on captured image data; a determination unit configured to determine a dynamic range of a printed product when viewed obtained by printing the captured image based on the captured image data, based on printing information on viewing of the printed product; and a conversion unit configured to perform conversion processing for luminance of the captured image data to the dynamic range determined by the determination unit from the dynamic range obtained by the obtaining unit.

According to another aspect of the present invention, there is provided an image processing method comprising: obtaining a dynamic range of a captured image on captured image data; determining a dynamic range of a printed product when viewed obtained by printing the captured image based on the captured image data, based on printing information on viewing of the printed product; and performing conversion processing for luminance of the captured image data to the dynamic range determined in the determining from the dynamic range obtained in the obtaining.

According to another aspect of the present invention, there is provided a non-transitory computer-readable storage medium storing a program for causing a computer to function as: an obtaining unit configured to obtain a dynamic range of a captured image on captured image data; a determination unit configured to determine a dynamic range of a printed product when viewed obtained by printing the captured image based on the captured image data, based on printing information on viewing of the printed product; and a conversion unit configured to perform conversion processing for luminance of the captured image data to the dynamic range determined by the determination unit from the dynamic range obtained by the obtaining unit.

According to the present invention, a printed product having appropriate brightness can be obtained in consideration of printing information such as the characteristic of the print sheet and the viewing environment of the printed product.

Further features of the present invention will become apparent from the following description of exemplary embodiments (with reference to the attached drawings).

BRIEF DESCRIPTION OF THE DRAWINGS

FIGS. 5A and 5B are tables showing the luminance values of inputs/outputs according to the present invention;

FIG. 6 is a flowchart of dynamic range compression processing according to the present invention;

DESCRIPTION OF THE EMBODIMENTS

First Embodiment

[System Arrangement]

Figure 1:
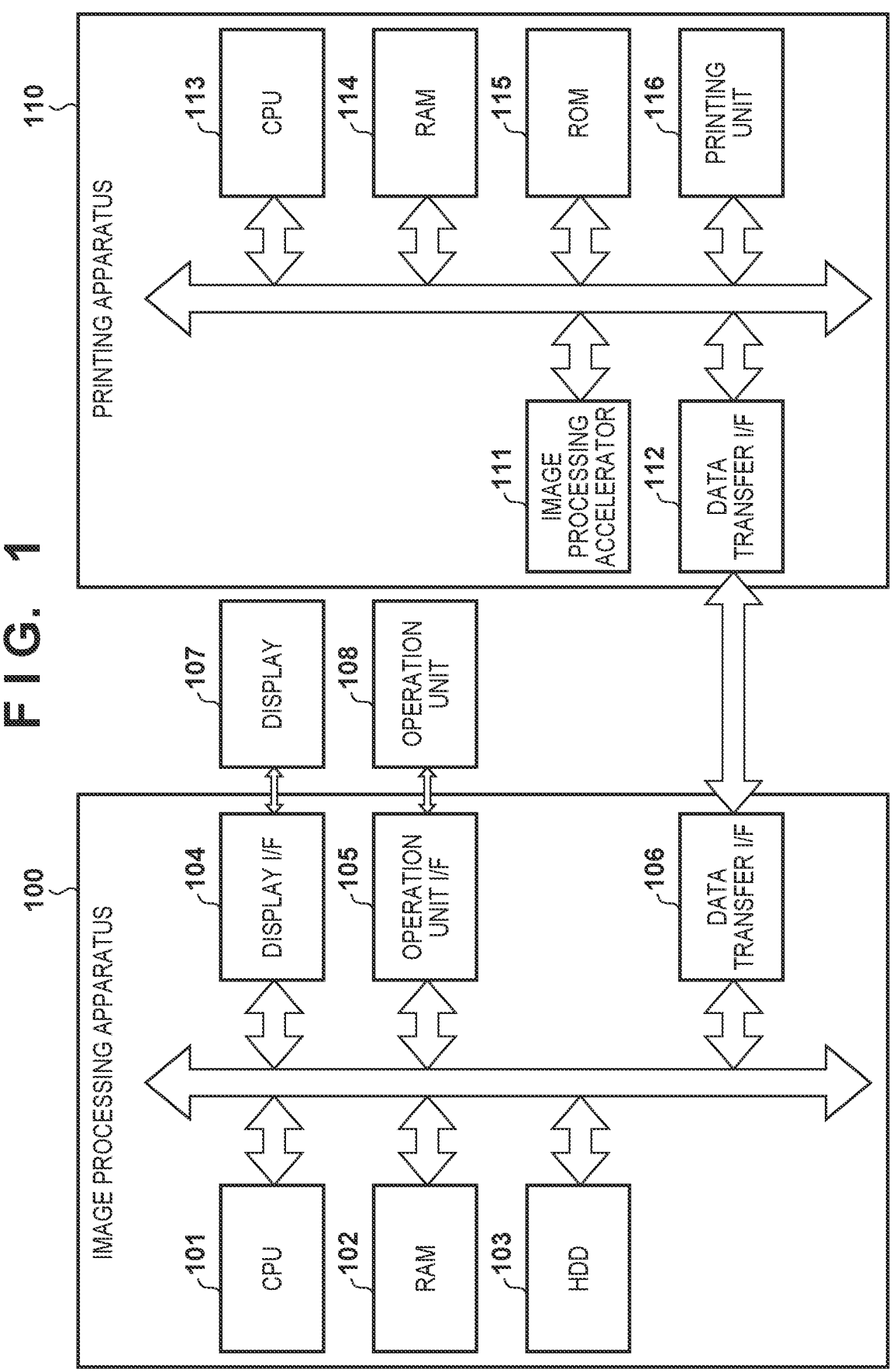
FIG. 1 is a block diagram showing an example of the hardware arrangement of a system according to the present invention.

FIG. 1 is a block diagram showing an arrangement example of a system applicable to this embodiment. In this embodiment, the system includes an image processing apparatus 100 and a printing apparatus 110. The image processing apparatus 100 is formed from a host PC functioning as an information processing apparatus. The image processing apparatus 100 includes a CPU 101, a RAM 102, an HDD 103, a display I/F 104, an operation unit I/F 105, and a data transfer I/F 106. These components are communicably connected via an internal bus.

The CPU 101 executes various kinds of processing using the RAM 102 as a work area in accordance with programs held in the HDD 103. The RAM 102 is a volatile storage area and is used as a work memory. The HDD 103 is a nonvolatile storage area and holds the programs according to this embodiment, an OS (Operating System), and the like. The display I/F 104 serves as an interface for exchanging data with a display 107 and the main body of the image processing apparatus 100. The operation unit I/F 105 serves as an interface for inputting, to the main body of the image processing apparatus 100, an instruction input using an operation unit 108 such as a keyboard and a mouse. The data transfer I/F 106 serves as an interface for exchanging data with an external device.

For example, the CPU 101 generates image data printable by the printing apparatus 110 in accordance with an instruction (for example, a command) by the user using the operation unit 108 and the programs held in the HDD 103. The CPU 101 transfers the resultant image data to the printing apparatus 110. In addition, in accordance with the programs stored in the HDD 103, the CPU 101 performs predetermined processing for the image data received from the external device via the data transfer I/F 106. The HDD 103 displays the processing results and various kinds of information on the display 107.

The printing apparatus 110 includes an image processing accelerator 111, a data transfer I/F 112, a CPU 113, a RAM 114, a ROM 115, and a printing unit 116. These components are communicably connected via an internal bus. Note that the printing method of the printing apparatus 110 is not limited to a specific one, but can be a printing apparatus of, for example, an inkjet or electrophotographic method. In the following description, a description will be made using the printing apparatus of the inkjet method as an example.

The CPU 113 executes various kinds of processing using the RAM 114 as the work area in accordance with the programs held in the ROM 115. The RAM 114 is a volatile storage area and is used as a work memory or the like. The ROM 115 is a nonvolatile storage area and holds programs according to this embodiment, an OS (Operating System), and the like. The data transfer I/F 112 serves as an interface for exchanging data with an external device. The image processing accelerator 111 is hardware for executing image processing at a speed higher than that of the CPU 113. When the CPU 113 writes a parameter and data necessary for image processing at a predetermined address of the RAM 114, the image processing accelerator 111 is activated. After the parameter and data are loaded, the image processing accelerator 111 performs predetermined image processing for this data. Note that the image processing accelerator 111 need not be an indispensable element, and equivalent processing can also be executed by even the CPU 113. The printing unit 116 performs a printing operation based on an instruction from the image processing apparatus 100.

The connecting method of the data transfer I/F 106 of the image processing apparatus 100 and the data transfer I/F 112 of the printing apparatus 110 need not be limited to a specific one. For example, USB (Universal Serial Bus), IEEE1394, or the like can be used. The connecting method can be a wired or wireless connecting method.

[Processing Block]

Figure 2:
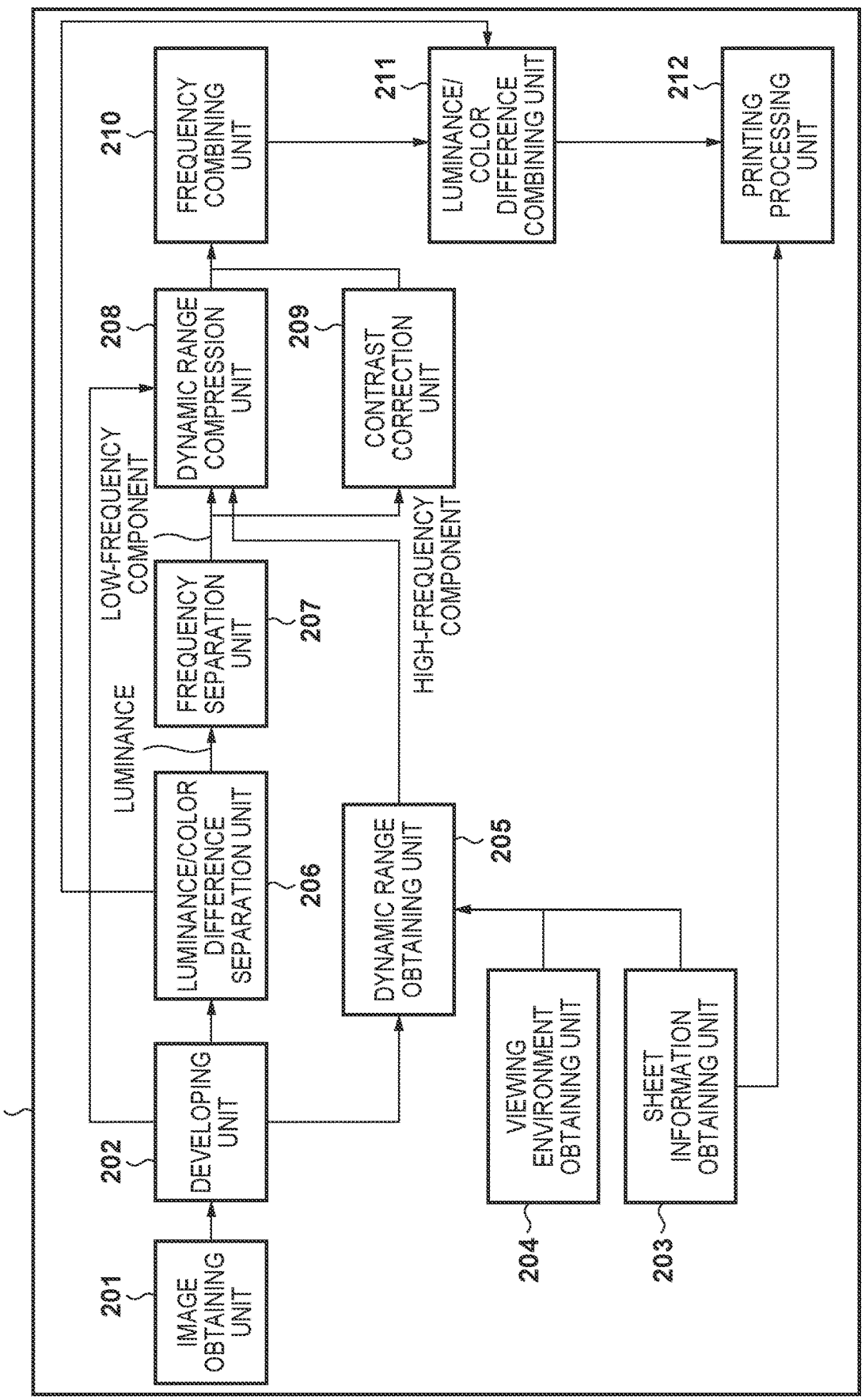
FIG. 2 is a block diagram showing the sequence of image processing according to the present invention.

FIG. 2 shows the processing blocks of image processing executed by the image processing apparatus 100 according to this embodiment. In this embodiment, an example in which a program corresponding to each processing block is included in an application 200 will be described. The application 200 operates in the image processing apparatus 100 serving as an information processing apparatus, and the CPU 101 reads out and executes the corresponding program. Note that the application 200 need not be one application but may be a plurality of applications in accordance with the application purpose and function of the user. In addition, part of the processing may be incorporated in the image capturing device (not shown) such as a camera or the printing apparatus 110, and the processing may be achieved by this incorporation.

An image obtaining unit 201 obtains processing target image data. The obtaining method may be arranged by obtaining image data held in the HDD 103 together with the information of an image capturing apparatus (not shown) which has performed image capturing. Alternatively, captured image data may be obtained from an external device (for example, an image capturing apparatus) via the data transfer I/F 106. A developing unit 202 converts an image obtained by the image obtaining unit 201 into a predetermined format by processing to be described later. The developing unit 202 also calculates the dynamic range of the image data and outputs the resultant value to a dynamic range obtaining unit 205.

A sheet information obtaining unit 203 obtains information of a sheet used for printing in accordance with the instruction and setting of the user and provides the information to the dynamic range obtaining unit 205. The information of the sheet coping with the printing apparatus 110 can be obtained upon an inquiry to the printing apparatus 110 and held in the HDD 103 in advance. A viewing environment obtaining unit 204 obtains information corresponding to the environment in which the printed product is viewed, in accordance with the instruction and setting of the user and provides the information to the dynamic range obtaining unit 205. The sheet information and the viewing environment information to be obtained here will be described later.

The dynamic range obtaining unit 205 obtains information output from each component and outputs the information to a dynamic range compression unit 208 upon specifying the input and output dynamic ranges based on the obtained information.

A luminance/color difference separation unit 206 separates an image having undergone the developing processing by the developing unit 202 into a luminance and color differences. The luminance/color difference separation unit 206 outputs the separated luminance information to a frequency separation unit 207, and the separated color difference information to a luminance/color difference combining unit 211. The frequency separation unit 207 separates the image luminance information into spatial low- and high-frequency components. Of the separated frequencies, the frequency separation unit 207 outputs the low-frequency component to the dynamic range compression unit 208, and the high-frequency component to the contrast correction unit 209. The dynamic range compression unit 208 executes dynamic range compression processing of the low-frequency component from the frequency separation unit 207 based on the value obtained by the dynamic range obtaining unit 205. In this case, the dynamic range compression unit 208 uses the data from the developing unit 202. The dynamic range compression unit 208 outputs the processed data to a frequency combining unit 210.

A contrast correction unit 209 performs contrast correction processing for the high-frequency component obtained from the frequency separation unit 207. The contrast correction unit 209 performs contrast correction processing for each frequency and outputs the result to the frequency combining unit 210. The frequency combining unit 210 combines the frequency components obtained from the dynamic range compression unit 208 and the contrast correction unit 209 and outputs the combined frequency components to the luminance/color difference combining unit 211. The luminance/color difference combining unit 211 combines the frequency obtained from the frequency combining unit 210 and the color difference information obtained from the luminance/color difference separation unit 206. The luminance/color difference combining unit 211 outputs the combined and generated image information to a printing processing unit 212.

The printing processing unit 212 performs processing required for printing of an image obtained from the luminance/color difference combining unit 211 and transmits the processing result to the printing apparatus 110. At this time, the sheet information obtained by the sheet information obtaining unit 203 is used together. Accordingly, the printing apparatus 110 outputs the printed product using the printing image processed by the image processing apparatus 100.

[Image Processing Sequence]

The image processing sequence according to this embodiment will be described with reference to FIG. 3. The flowchart in FIG. 3 corresponds to the operation of each processing block in FIG. 2.

In step S301, the image obtaining unit 201 obtains the image data obtained by an image capturing apparatus (not shown). The image data to be obtained here is not versatile data of a format such as a JPEG format, but can be data directly obtained from an image capturing apparatus (not shown), that is, so-called RAW data. This is because the dynamic range of the image processing is extended by the developing processing executed in step S302.

Figure 4:
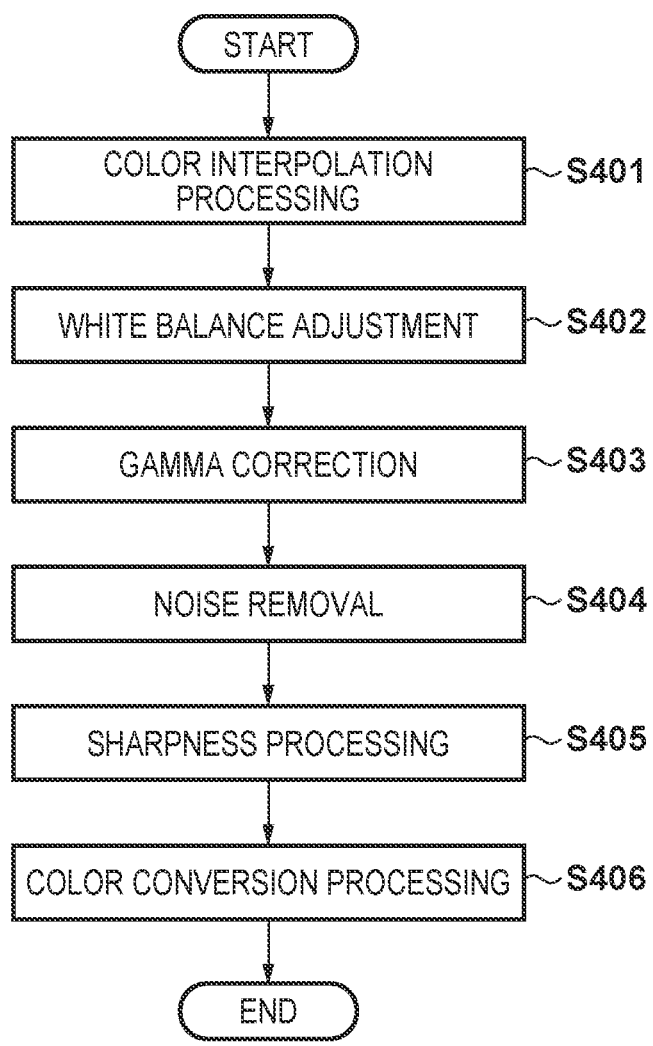
FIG. 4 is a flowchart of developing processing according to the present invention.

In step S302, the developing unit 202 performs the developing processing. FIG. 4 shows the flowchart of the developing processing.

In step S401, the developing unit 202 performs color interpolation processing. The developing unit 202 performs de-Bayer processing or mosaic processing for each pixel in the RAW data formed by a monochrome signal. By this processing, the signal value of each pixel is converted into an RGB image signal value. A known method is used for the color interpolation processing, and a detailed description thereof will be omitted.

In step S402, the developing unit 202 performs white balance adjustment. The developing unit 202 performs white balance processing in accordance with a preset developing setting. A coefficient corresponding to the developing setting is defined in advance and is held in the HDD 103 or the like. The developing unit 202 multiplies each signal value of R, G, or B of the pixel by a set coefficient.

In step S403, the developing unit 202 performs gamma correction. The developing unit 202 applies gamma correction in consideration of the developing setting and the characteristic of the printing apparatus. Since the gamma correction is a known technique, a detailed description thereof will be omitted.

In step S404, the developing unit 202 performs noise removal. In step S405, the developing unit 202 performs sharpness processing. In this embodiment, the noise removal and the sharpness processing can be performed by filter processing. The contents of these processing operations can be applied, as needed, based on the user setting and the image capturing condition.

In step S406, the developing unit 202 performs color conversion processing. As the color conversion processing, conversion into a defined predetermined color space, hue adjustment, and processing for suppressing color distortion of the high-luminance region. This processing sequence ends. By the above developing processing, an RGB image having a desired gamma value is generated.

Referring back to FIG. 3, in step S303, the dynamic range obtaining unit 205 obtains luminance data of the respective bright and dark portions of the input. The luminance data of the bright portion is obtained by a value calculated from the camera information and image capturing setting included in the obtained image data and a value extended in the developing processing in step S302. More specifically, when performing white balance adjustment in step S402 of FIG. 4, replacement processing is performed in accordance with the saturation level and the pixel information, thereby extending the gradation of the high-luminance region (N stages: N≥1). The processing of this step can be performed using, for example, a method disclosed in Japanese Patent Laid-Open No. 2015-156615.

FIG. 5A shows an example of the camera information and the luminance value of the bright portion for each image capturing setting according to this embodiment. FIG. 5A shows the luminance values of the image capturing modes for the types of the cameras. In this embodiment, the types (A to C) of three cameras (image capturing apparatuses) are shown. As the image capturing modes of each camera are exemplified as a normal mode and a high-luminance obtaining mode. The high-luminance obtaining mode is the image capturing setting used when image capturing is performed with an exposure condition darker by one step. A luminance value R shown in FIG. 5A is a luminance value (unit: %, the relative value when the measured luminance is set to 18%) of the high-luminance portion. Based on extension information (extendible by N steps) in the high-luminance region obtained in step S302, a luminance value $Yi(W)$ of the bright portion of the final input signal is calculated:

$$Yi(W)=R\times 2N \quad (1)$$

where N is the number of steps for extending the gradation.

Since a case in which light does not enter is assumed for the luminance Yi(D) of the dark portion of the input image, Yi(D)=0 independently of the setting.

In step S304, the dynamic range obtaining unit 205 obtains luminance data of the bright and dark portions on the output side. FIG. 5B shows an example of luminance values for the respective sheet types according to this embodiment. In this embodiment, three sheet types are shown. The luminance values of a black portion Yo(D) and a white portion Yo(W) for each sheet type are shown. A luminance value [cd/m²] is a value (white serving as the reference≈100 [cd/m²]) of the predetermined general illumination environment. Note that a value obtained by conversion in consideration of a visual characteristic may be used as the luminance value. The sheet information shown in FIG. 5B is provided by the sheet information obtaining unit 203.

In step S305, the luminance/color difference separation unit 206 separates the RGB signal value into a luminance (Y) and color differences (CbCr). The RGB-YCbCr conversion is performed by equations (2) below:

$$Y=0.29900\times R+0.58700\times G+0.11400\times B$$

$$Cb=-0.16874\times R-0.33126\times G+0.50000\times B$$

$$Cr=0.50000\times R-0.41869\times G-0.081\times B \quad (2)$$

However, the conversion equations are not limited to the above equations, and other conversion equations may be used.

The Y value (luminance value) obtained by the above conversion equation is used as the luminance component in the frequency separation processing in step S305. The CbCr values are used as the color difference components in the luminance/color difference combining processing in step S310.

In step S306, the frequency separation unit 207 separates the frequency of the luminance of the image separated in step S305 into low- and high-frequency component images. In this embodiment, a low-pass filter is applied to extract the low-frequency component. A spatial filter may be applied to the processing method. Alternatively, the frequency component is converted into a spatial frequency by FFT (Fast Fourier Transform) and returned by IFFT (Inverse Fast Fourier Transform) upon the filter processing. A target frequency may be determined in consideration of human visual characteristic such as a viewing distance for allowing the user to view the printed product and its sheet size. Accordingly, the classification of the high- and low-frequency components included in the frequency need not be fixed, but can change depending on the above reference. An inverse high-pass filter may be applied to the high-frequency component, or the obtained low-frequency component may be divided from the original image to obtain the high-frequency component. The resultant low-frequency component may be used in the dynamic range compression processing in step S307, and the high-frequency component is used in the contrast correction processing in step S308.

In step S307, based on the information of the bright and dark portions of the input and output sides obtained in steps S303 and S304, the dynamic range compression unit 208 performs the dynamic range compression processing for the low-frequency component obtained in step S306. Details of the processing will be described later with reference to FIG. 6.

In step S308, the contrast correction unit 209 performs the contrast correction processing for the high-frequency component obtained in step S306. More specifically, the resultant image is multiplied by a coefficient k. At this time, the coefficient is set closer to k=1 when the scene is set closer to the scene at the time of image capturing. In addition, if the degradation such as bleeding of the ink of the printed product is taken into consideration, a value larger than 1 is set as the coefficient k. The value of the coefficient k may be changed based on the setting and instruction from the user.

In step S309, the frequency combining unit 210 combines an image obtained by dynamic range-compressing the low-frequency component obtained in step S307 and an image obtained by contrast-correcting the high-frequency component obtained in step S308. Accordingly, the images are compressed to a predetermined dynamic range, and a luminance image having contrast correction is obtained.

In step S310, the luminance/color difference combining unit 211 combines the luminance image obtained in step S310 and the color difference components obtained in step S305 and performs YCbCr-RGB conversion by:

$$R=Y+1.40200\times Cr$$

$$G=Y-0.34414\times Cb-0.71414\times Cr$$

$$B=Y+1.77200\times Cb \quad (3)$$

Accordingly, the image of the RGB signal value is obtained. Equations (3) correspond to equations (2). If equations different from equations (2) are used, equations (3) are changed accordingly.

In step S311, the printing processing unit 212 performs image processing for printing of the image of the obtained RGB signal value. Details of this step will be described later with reference to FIG. 7. This processing sequence then ends.

(Dynamic Range Compression Processing)

The dynamic range compression processing according to this embodiment will be described with reference to FIG. 6. This step corresponds to processing in step S307 of FIG. 3.

Figure 3:
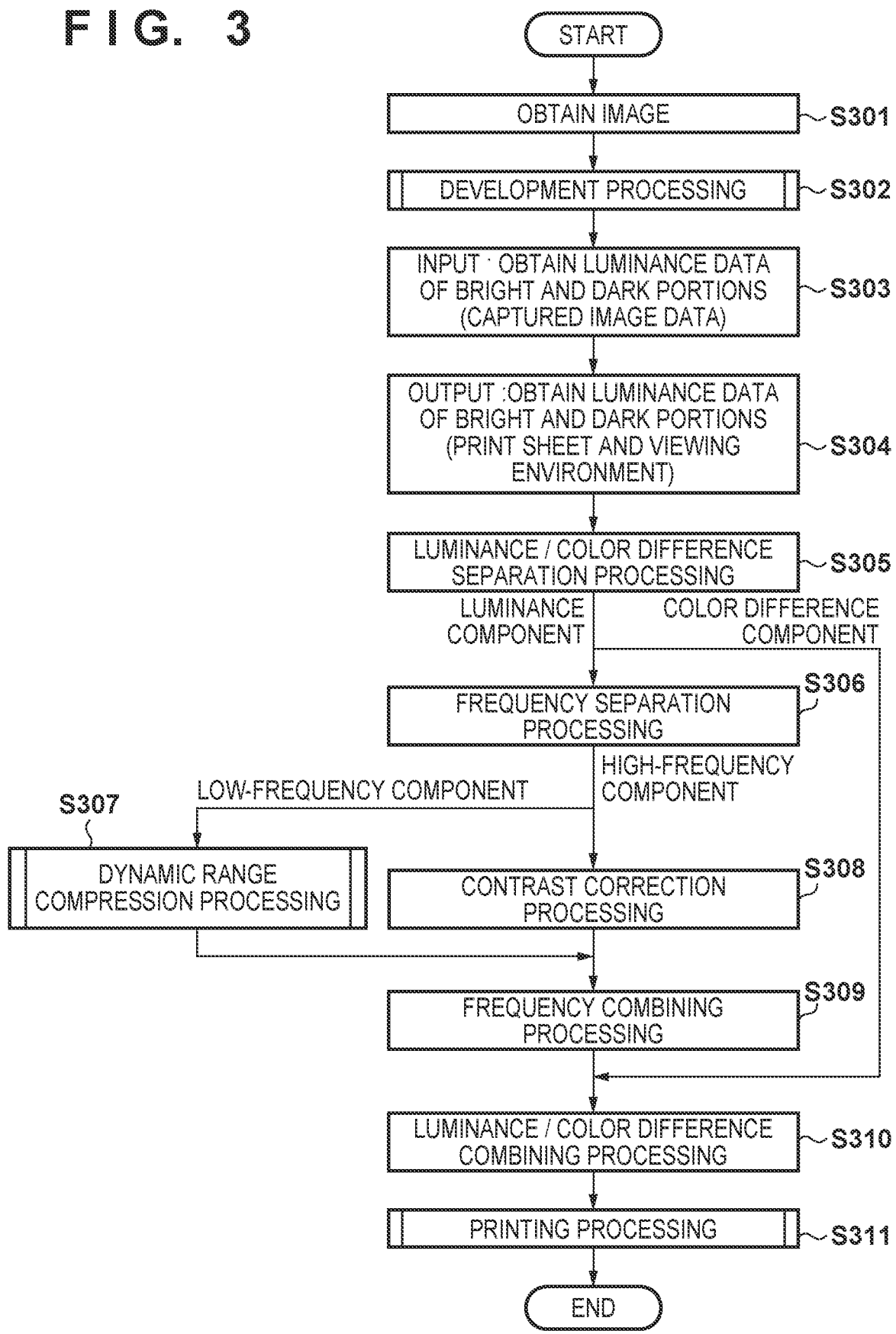
FIG. 3 is a flowchart of image processing according to the present invention.

In step S601, the dynamic range compression unit 208 calculates compression ranges from the information of the bright and dark portions obtained in steps S303 and S304 of FIG. 3. The compression ranges are obtained by:

$$Di=Yi(W)-Yi(D) \quad (4)$$

$$Do=Yo(W)-Yo(D) \quad (5)$$

where Yi(W) and Yi(D) are luminance data of the bright and dark portions of the input obtained from the input captured image data, and Yo(W) and Yo(D) are luminance data of the bright and dark portions of the output obtained from the print sheet and the viewing environment.

Di and Do represent the dynamic ranges on the input and output sides, respectively. More specifically, Di is the dynamic range of the input image data, and Do is the dynamic range used at the time of output (printing). Note that in the description of the sequence in FIG. 3, the unit of the bright and dark portions of the input is given as [%], and the unit of the bright and dark portions of the output is given as [cd/m²]. In this case, the equivalent conversion enable criterion is given as 1%=1 cd/m². In addition, the dynamic range compression unit 208 obtains an exposure luminance value Ya. This value indicates the time when the user sets the exposure at the time of image capturing. In this case, exposure setting luminance Ya=18[%].

In step S602, the dynamic range compression unit 208 divides the target image into predetermined regions. This division can be performed in a predetermined rectangular size. Alternatively, similar luminance pixels may be grouped from the luminance image information. In the latter method, by restoring the contrast of a specific luminance range obtained upon region division, an image whose contrast is held more accurately can be obtained. In addition, in order to obtain a preferable printed product, RGB developed by the developing unit 202 may be used in addition to the luminance data. Image recognition can be performed by the RGB data, and a contrast restoration method matching the recognized region type becomes possible.

Figure 8A:
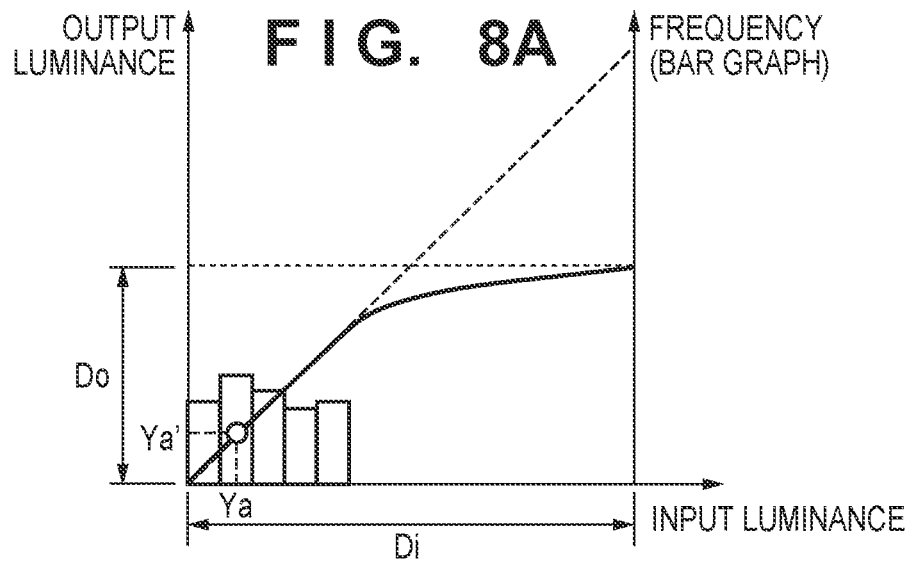
FIGS. 8A, 8B, and 8C are graphs showing examples of conversion curves for the respective regions according to the first embodiment.
Figure 8B:
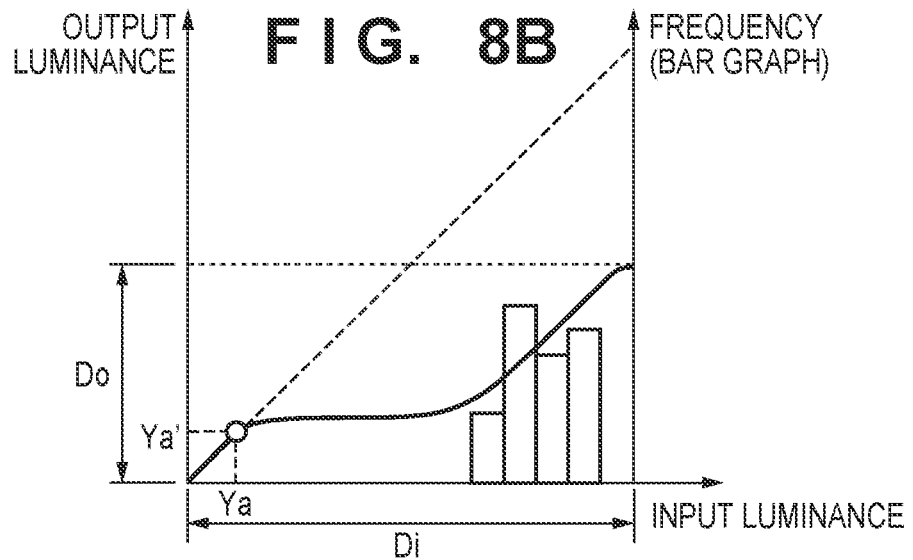
Figure 8C:
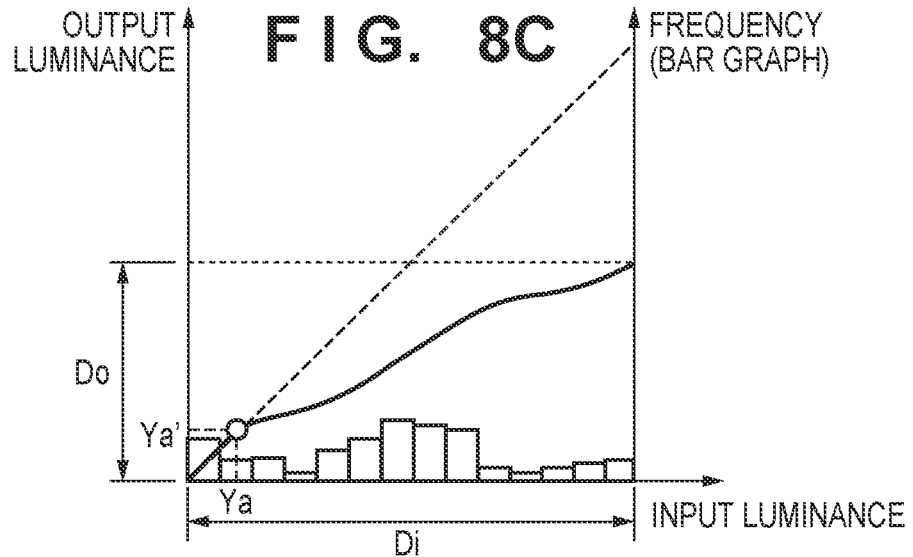

In step S603, the dynamic range compression unit 208 creates a conversion curve for each of the regions divided in step S602. FIGS. 8A to 8C show the example of conversion curves according to this embodiment. Each conversion curve indicates a correspondence relationship between the input and output values of luminance and is a conversion condition used for conversion of the luminance value. Referring to FIGS. 8A to 8C, the abscissa represents the input luminance, and the ordinate represents the output luminance. In addition, each broken line indicates a straight line whose slope passing through the origin is 45°, and each thick line indicates the conversion curve. Referring to FIGS. 8A to 8C, bar graphs indicate the luminance distribution of the regions and correspond to the frequency of predetermined luminance range (to be referred to as a luminance group hereinafter). The value corresponding to the frequency (bar graphs) of the luminance distribution is shown on the right side of each of FIGS. 8A to 8C. The input and output dynamic ranges Di and Do obtained in step S601 are indicated by arrows in each of FIGS. 8A to 8C.

Assume the slope of each conversion curve. If the slope is 1, that is, 45°, no change in image at this position occurs. That is, the contrast before the dynamic range conversion is maintained even after the dynamic range conversion. When the slope decreases (an angle is less than 45°), the contrast after conversion becomes lower than that before conversion. That is, when the slope comes close to 1, the variation of the contrast after the conversion becomes small, and the contrast is maintained. In order to obtain a preferable printed product, the contrast must be maintained. The slope is preferably maintained at 1. In this case, since the low-frequency component is handled, the conversion must be performed to maintain the slope to 1 as much as possible in order to maintain the contrast of the low-frequency component.

In this embodiment, assume that a mat sheet having a low black density is used and the illumination is not made for a printed product. The sheet and the viewing environment are instructed or set by the user when performing image processing. The image processing apparatus 100 (the application 200) can provide a user interface (not shown) by which the user can perform various settings. In this case, the output range is set to be narrow. A conversion curve is created in accordance with the frequency of the region. FIG. 8A shows a conversion curve for a given region. Referring to FIG. 8A, the slope is set closer to 1 for a low-luminance group having a high frequency. The slope becomes moderate for a high-luminance group having a low frequency (the slope is set closer to 0).

FIG. 8B shows a conversion curve corresponding to another region. This is an example in which the luminance distribution is localized to the high-luminance side. As in FIG. 8A, it is obvious that a slope closer to 1 is assigned to a luminance group having a high frequency in accordance with the frequency of the luminance distribution. That is, the slope is set closer to 0 on the low-luminance side having a low frequency of the luminance distribution. The slope is set closer to 1 on the high-luminance side having a high frequency of the luminance distribution. As an entire image, the variation in luminance in a local range can be maintained before and after the conversion or the change in luminance variation can be reduced before and after the conversion although the range of the luminance before and after the conversion is changed.

FIG. 8C shows an example of a given region in which the luminance distribution is uniform. In this case, the slope cannot be assigned to 1 even for the luminance group having a high frequency. If the slope of a specific luminance group is assigned to 1 because the output dynamic range Do is narrower than Di, the slope of another luminance group becomes closer to 0. In this case, the slope is averagely assigned, and the distribution depending on the frequency is performed so the slope will not extremely come closer to 0.

In FIGS. 8A to 8C showing the different regions in the image, locations where the slopes are the same exist. Such a location corresponds to an exposure setting luminance Ya obtained in step S601. In the print sheet (mat sheet) assumed in this embodiment, the exposure setting luminance Ya is converted into the luminance value of Ya' predetermined in the printing processing. A conversion curve indicating that the printed result is always constant as Ya' for the luminance value Ya is created. In the case shown in FIGS. 8A to 8C, a conversion curve having a slope of 1 is created in the range from the origin to the exposure setting luminance Ya. The value of Ya' is determined in consideration of the color conversion processing (step S701) of the printing processing to be described with reference to FIG. 7. In this case, a printed product has a value having an intermediate luminance of about $L^*=50$. Accordingly, the exposure luminance set by the user at the time of image capturing can be maintained while the printed product in which the gradation of the high-luminance region is reproduced is obtained.

In step S604, the dynamic range compression unit 208 determines whether creation of the conversion curves of all the regions divided in step S602 is completed. If the creation is not completed (NO in step S604), the process returns to step S603; otherwise (YES in step S604), the process advances to step S605.

In step S605, the dynamic range compression unit 208 executes the dynamic range compression processing for each pixel in a region using the conversion curve of the corresponding region. In this case, the dynamic range compression unit 208 performs processing in consideration of peripheral region information so as not to generate a location in which the gradation between the regions is discontinuous. The method in this case is not limited to a specific one, but there can be enumerated a method of performing weighting using an area included in a window which has the size almost equal to the region and calculating the ratio of the weighted results, as indicated in the above literature "Technology to Optimize Image Brightness and Contrast".

If the area ratio is a simple area ratio, a trouble such as a halo is generated at the boundary, so that the weight can be changed in accordance with the average luminance of the target region. That is, when the average luminance of the peripheral region is different from that of the target pixel, the weight is reduced to suppress the image trouble.

In step S606, the dynamic range compression unit 208 determines whether the compression processing of all the pixels is completed. If the compression processing of all the pixels is completed (YES in step S606), this processing sequence ends; otherwise (NO in step S606), the process returns to step S605 to apply the compression processing to an unprocessed pixel.

(Printing Processing)

Figure 7:
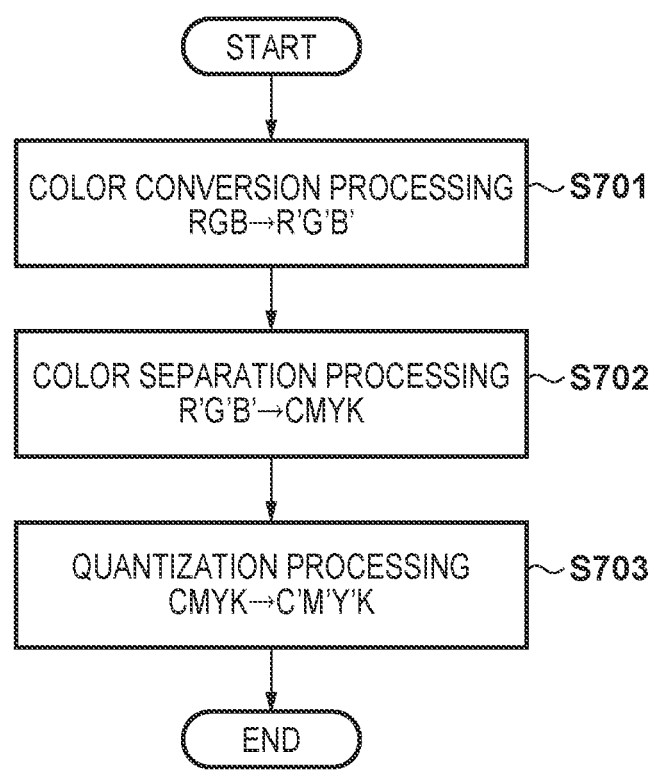
FIG. 7 is a flowchart of printing processing according to the present invention.

FIG. 7 is a flowchart of the printing processing according to this embodiment. This processing corresponds to step S311 in FIG. 3.

In step S701, the printing processing unit 212 performs the color conversion processing. The printing processing unit 212 converts the obtained RGB into R'G'B' suitable for the color of a sheet set by the user in advance. In this case, the color of the sheet is converted based on sheet information obtained from the sheet information obtaining unit 203. Various conversion methods are available. For example, there is a method using a lookup table in which values to be converted are described at discrete lattice points. As described above, the luminance value Ya' of the conversion curve generated in step S603 of FIG. 6 is defined in accordance with processing of this step.

In step S702, the printing processing unit 212 decomposes the converted R'G'B' into ink colors actually used for printing. Even in this step, conversion is performed based on a lookup table optimized for each set sheet. Note that in FIG. 7, an example of CMYK (C: cyan ink, M: magenta ink, Y: yellow ink, and K: black ink) is described. However, the color system is not limited to this, but can be changed in accordance with the number of inks subjected to printing and the types of printing agents.

In step S703, the printing processing unit 212 performs conversion to the gradation count receivable by the printing apparatus 110 which performs printing. As a typical conversion method, error diffusion processing or dither processing is enumerated. For photo printing, error diffusion processing or processing using a dither matrix having a blue noise characteristic is preferable. Data to be converted into the gradation count of the printing apparatus 110 is transferred to the printing apparatus 110. After that, the printing apparatus 110 performs printing, and then this processing sequence ends.

Note that the above description is merely an example. In pixel value conversion, an arrangement using an ICC profile may be used.

The above processing sequence can obtain a printed product having appropriate brightness in consideration of the characteristic of the print sheet and the viewing environment of the printed product.

As described above, this embodiment has described a method of suitably printing image data by exemplifying a viewing environment in which a print sheet having narrower dynamic range than that of an input image is not illuminated. As a result, a photo image whose contrast is maintained can be obtained in a state in which the exposure matching the image capturing by the user is not deviated.

Note that the processing arrangement is not limited to the one described above. For example, the operations of the image obtaining unit 201 and the developing unit 202 may be performed in an image capturing apparatus (not shown). In this case, the image processing apparatus 100 receives an image via an image obtaining interface (not shown). Various formats ranging from the dedicated format to the versatile format can be used as an image format. In this case, it is important not to omit the information of the gradation characteristic and color reproducibility.

Second Embodiment

As the second embodiment of the present invention, processing will be described by exemplifying a case in which a glossy sheet is used as a print sheet, and a viewing environment for illuminating a printed product is assumed. The glossy sheet has a surface gloss level higher than that of the mat sheet shown in the first embodiment. A description of the arrangement which overlaps the first embodiment will be omitted, and only differences will be described below.

The lightness is generally set to 500 to 1,000 [lx] as the illumination, but various lightness values are available. In this case, the lightness is assumed that the white portion of the sheet is set to about 200 [cd/m$^2$].

Figure 9A:
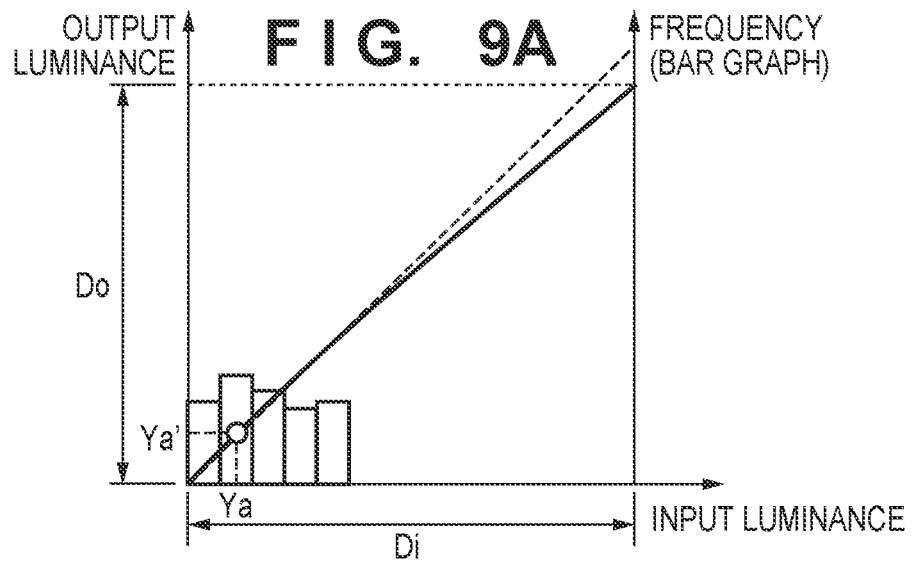
FIGS. 9A, 9B, and 9C are graphs showing examples of conversion curves for the respective regions according to the second embodiment.
Figure 9B:
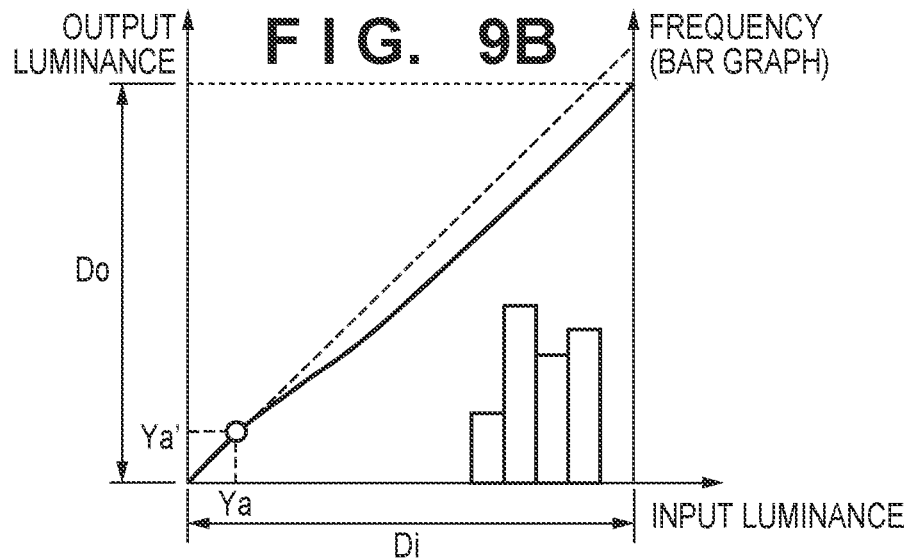
Figure 9C:
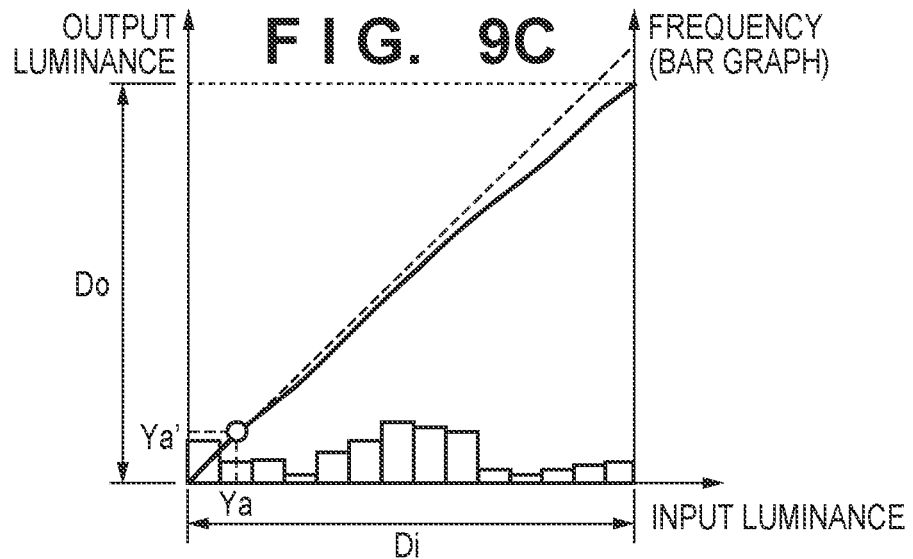

FIGS. 9A to 9C show an example of a conversion curve for each region when an output dynamic range Do is widened. That is, by using a glossy sheet as a sheet, the output dynamic range Do becomes wider than that of the example of FIGS. 8A to 8C shown in the first embodiment. Note that a target image and a region to be divided are the same as in the first embodiment.

Since the output dynamic range Do is wider than that of FIGS. 8A to 8C described in the first embodiment, a slope closer to 1 can be assigned to the frequency of luminance in each of FIGS. 9A to 9C.

The conversion from an exposure setting luminance Ya to a luminance value Ya' maintained after printing has the same value as in the first embodiment. However, illumination must be taken into consideration. That is, since a printed product must have appropriate brightness when the printed product is illuminated, the brightness of the printed product (the printed product without illumination) itself has a lower level than that in the first embodiment. In the second embodiment, in step S603 of FIG. 6, a conversion curve is created in consideration of illumination. If the brightness of the white portion without illumination having a predetermined condition is given as Yp (FIG. 5B), conversion is performed such that Ya is set to Yp/200 in consideration of the case in which the brightness of the white portion of the sheet is 200 [cd/m$^2$].

The region division in step S602 of FIG. 6 can be performed in consideration of the brightness of the white portion of the sheet. If the white portion of the sheet becomes bright, and the output dynamic range Do is widened, the conversion curve is readily obtained to set the slope of 1 even if the region division is not fine, thereby reducing the number of regions. As a result, this is effective in view of the processing load. That is, the number of regions for division and its method can be switched in accordance with the printing information such as the type of sheet and the viewing environment.

As has been described above, according to this embodiment, even in a viewing environment (for example the lightness of the white portion of the printed product is 200 [cd/m$^2$] with illumination, a preferable printed product which maintains the contrast and the exposure at the time of image capturing can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125284, filed Jun. 29, 2018, which is hereby incorporated by reference herein in its entirety.

What is claimed is:

1. An image processing apparatus comprising:
an obtaining unit configured to obtain a dynamic range, being a range of possible values of luminance, of a captured image on captured image data;
a determination unit configured to determine a dynamic range of a printed product when viewed, obtained by printing the captured image based on the captured image data, based on information regarding a printing medium on which the captured image is to be printed;
an acquisition unit configured to acquire information of luminance and color difference of the captured image based on the captured image data;
a creating unit configured to create a conversion condition indicating a correspondence relationship between input luminance and output luminance based on (1) the dynamic range of the captured image obtained by the obtaining unit and (2) the dynamic range of the printed product determined by the determination unit; and
a conversion unit configured to perform conversion processing for converting the acquired luminance of the captured image into luminance corresponding to the dynamic range determined by the determination unit.

2. The apparatus according to claim 1, wherein the conversion unit performs the conversion processing using the conversion condition set in a manner such that luminance having a first distribution frequency in the captured image data has a variation of luminance by the conversion processing smaller than that of luminance having a second distribution frequency lower than the first distribution frequency.

3. The apparatus according to claim 2, wherein the creating unit sets the conversion condition based on an exposure setting when the captured image data is obtained.

4. The apparatus according to claim 2, wherein the conversion unit divides the captured image data into a plurality of regions and performs the conversion processing using the conversion condition set for each of the plurality of regions.

5. The apparatus according to claim 4, wherein the conversion unit switches one of a division count and a division method of the captured image data based on the dynamic range of the captured image and the information.

6. The apparatus according to claim 1, wherein the determination unit determines the dynamic range of the printed product further based on information of an illumination emitted on a printed product, which is printed based on the captured image data, when the printed product is viewed.

7. The apparatus according to claim 1, further comprising a separation unit configured to separate luminance of the captured image data into a low-frequency component and a high-frequency component,
wherein the conversion unit performs the conversion processing for the low-frequency component.

8. The apparatus according to claim 7, further comprising:
a correction unit configured to perform contrast correction for the high-frequency component; and
a combining unit configured to combine (1) a high-frequency component having undergone the contrast correction performed by the correction unit and (2) a low-frequency component having undergone the conversion processing performed by the conversion unit.

9. The apparatus according to claim 1, further comprising a unit configured to perform conversion of image data having undergone the conversion processing performed by the conversion unit,
wherein, in the conversion, the image data is converted to a signal corresponding to a printing agent used by a printing apparatus which performs printing.

10. The apparatus according to claim 1, wherein an image capturing apparatus which has captured the captured image data is operable in a plurality of image capturing modes having different dynamic ranges, and
wherein the obtaining unit obtains the dynamic range specified using image capturing mode information obtained when capturing the captured image data.

11. An image processing method comprising:
obtaining a dynamic range, being a range of possible values of luminance, of a captured image on captured image data;
determining a dynamic range of a printed product when viewed, obtained by printing the captured image based on the captured image data, based on information regarding a printing medium on which the captured image is to be printed;
acquiring information of luminance and color difference of the captured image based on the captured image data;
creating a conversion condition indicating a correspondence relationship between input luminance and output luminance based on (1) the dynamic range of the captured image obtained in the obtaining and (2) the dynamic range of the printed product determined in the determining; and
performing conversion processing for converting the acquired luminance of the captured image into luminance corresponding to the dynamic range determined in the determining.

12. A non-transitory computer-readable storage medium storing a program for causing a computer to function as:
an obtaining unit configured to obtain a dynamic range, being a range of possible values of luminance, of a captured image on captured image data;
a determination unit configured to determine a dynamic range of a printed product when viewed, obtained by printing the captured image based on the captured image data, based on information regarding a printing medium on which the captured image is to be printed; and an acquisition unit configured to acquire information of luminance and color difference of the captured image based on the captured image data;

a creating unit configured to create a conversion condition indicating a correspondence relationship between input luminance and output luminance based on (1) the dynamic range of the captured image obtained by the obtaining unit and (2) the dynamic range of the printed product determined by the determination unit; and a conversion unit configured to perform conversion processing for converting the acquired luminance of the captured image into luminance corresponding to the dynamic range determined by the determination unit.

* * * * *